July 4, 1933.   G. E. EDMUNDS   1,916,785
MINE CAR BRAKE MECHANISM
Filed June 22, 1931   7 Sheets-Sheet 1
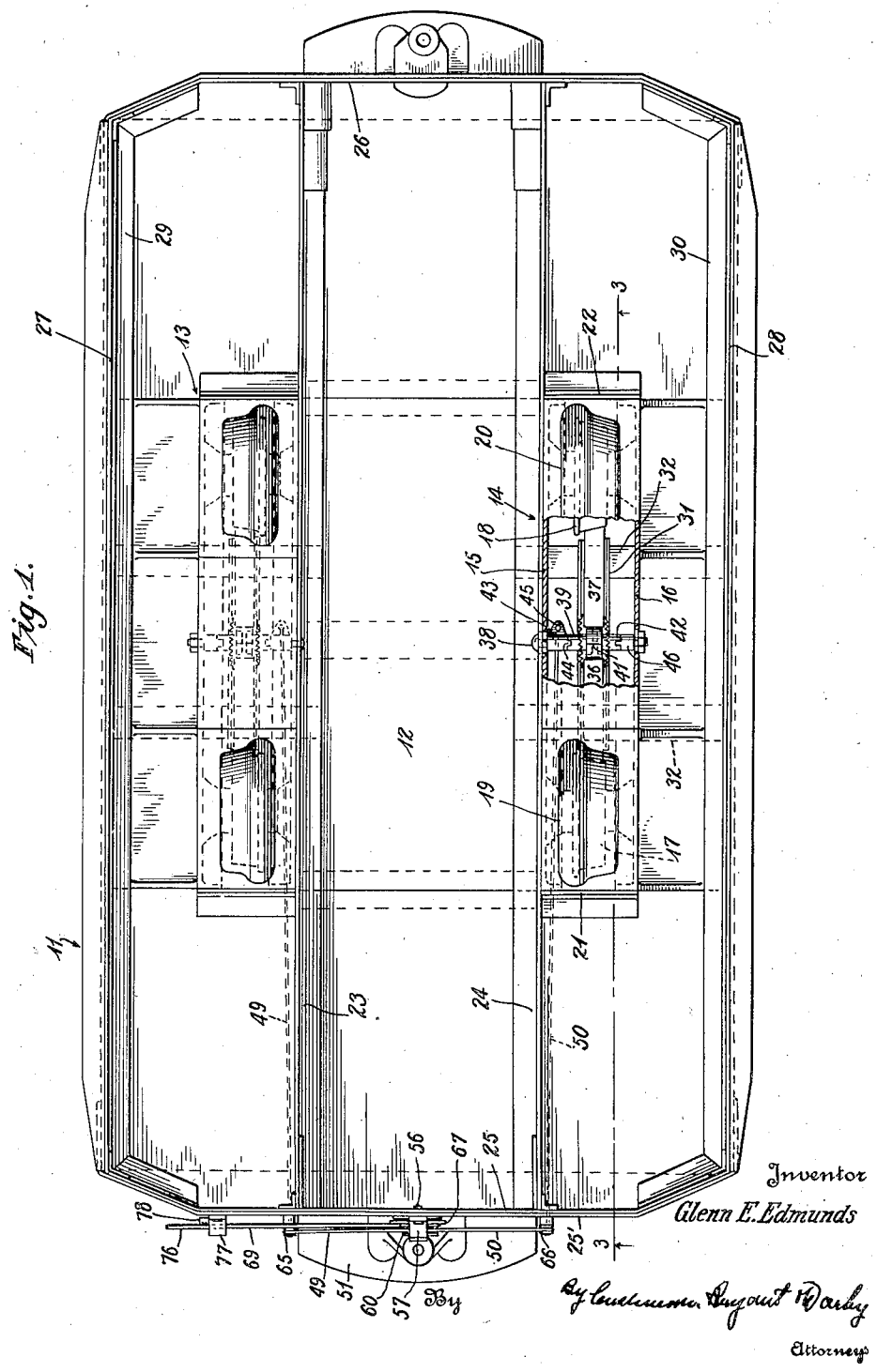

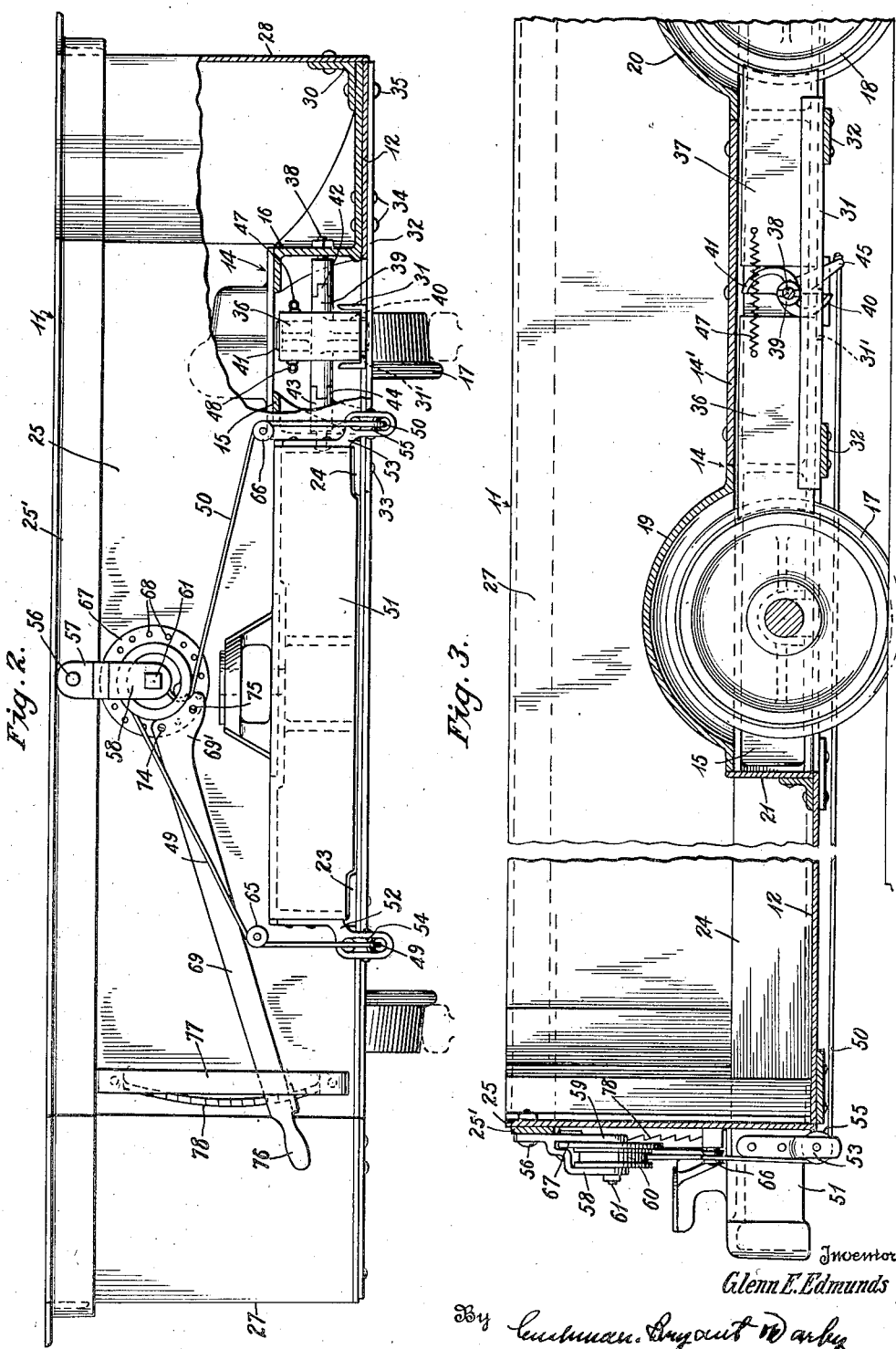

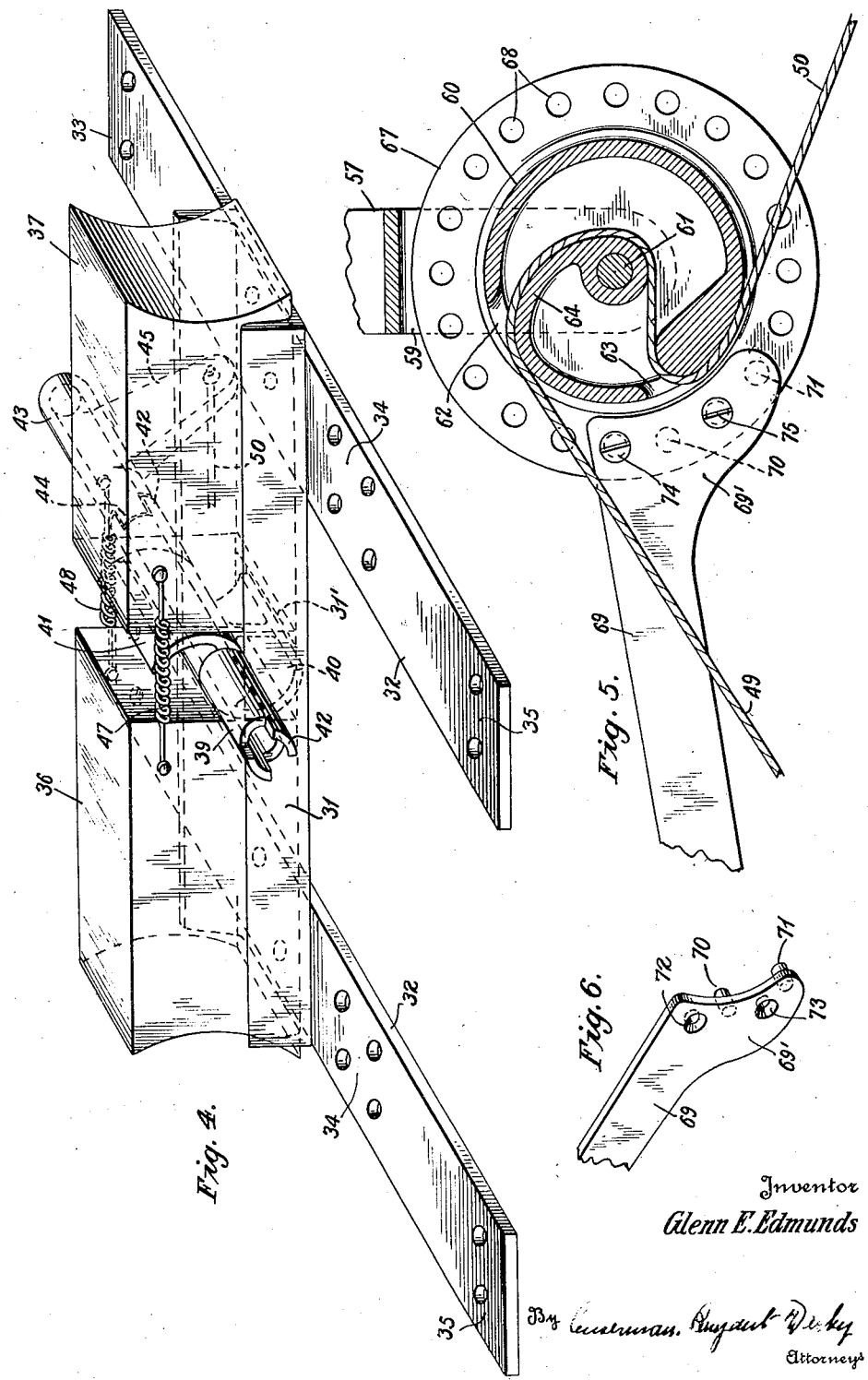

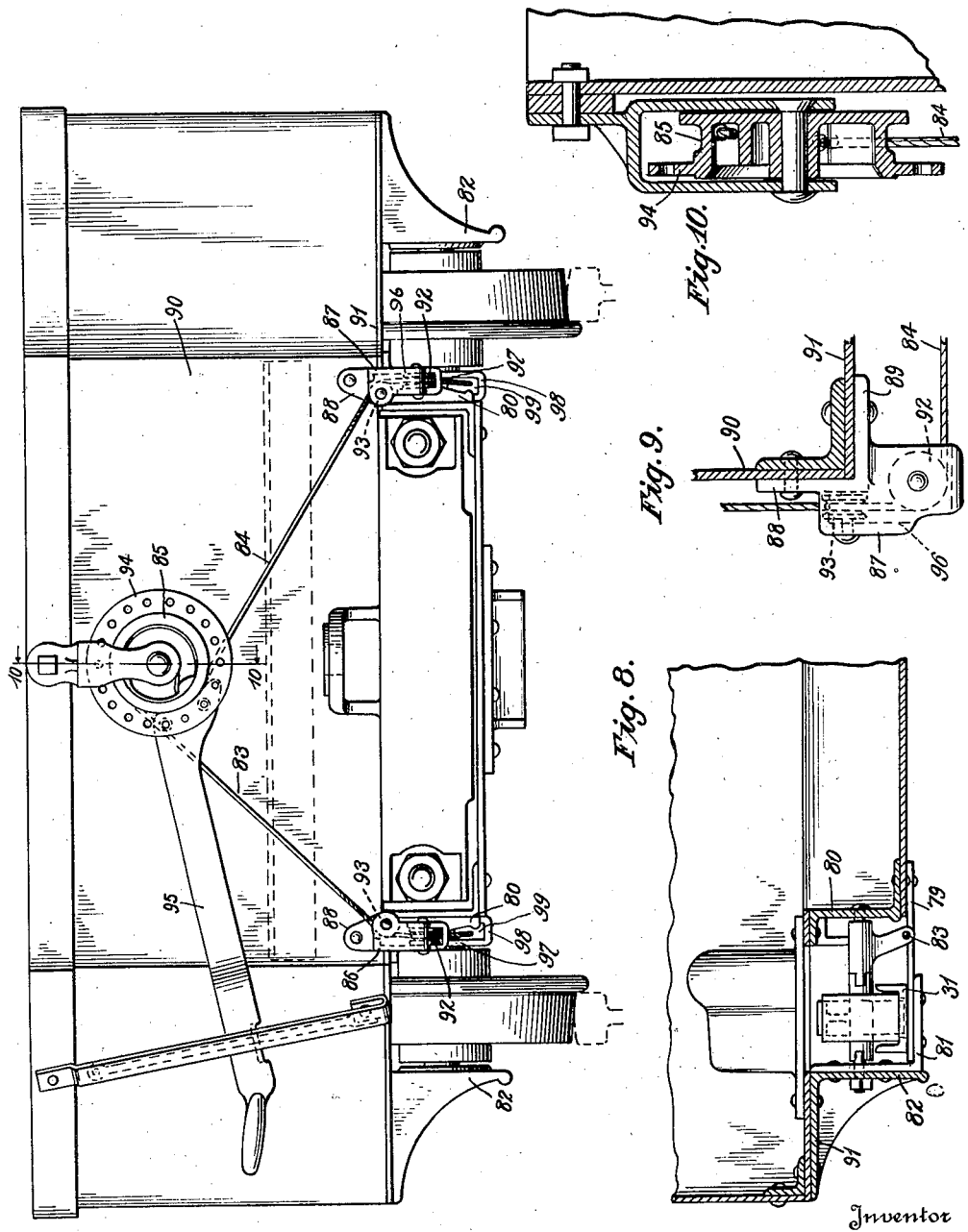

July 4, 1933. G. E. EDMUNDS 1,916,785
MINE CAR BRAKE MECHANISM
Filed June 22, 1931    7 Sheets-Sheet 5

Inventor
Glenn E. Edmunds
By Coulenga, Bryant Darby
Attorneys

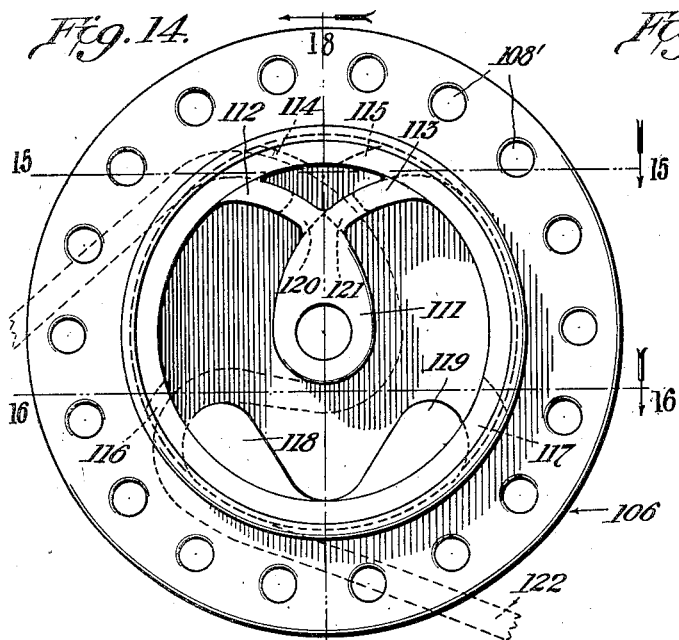
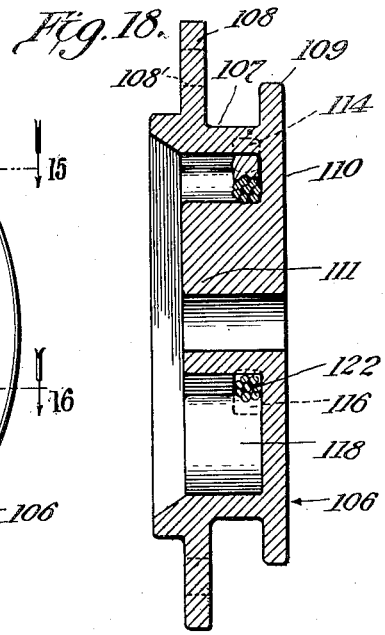
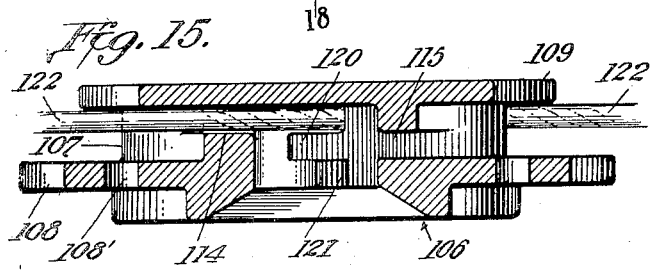
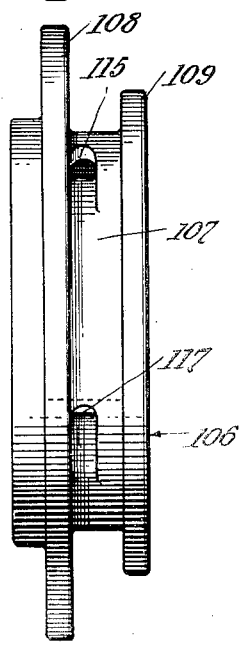
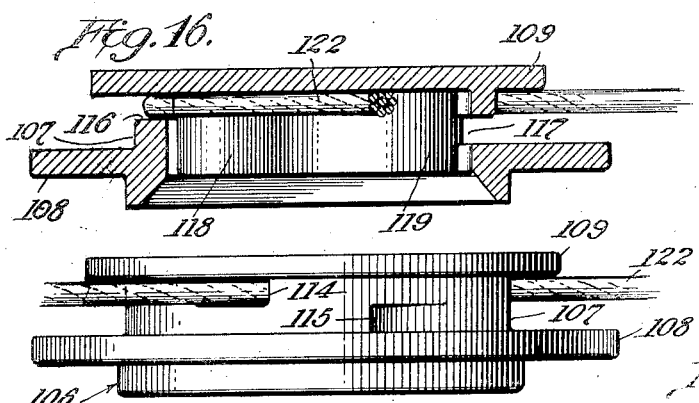

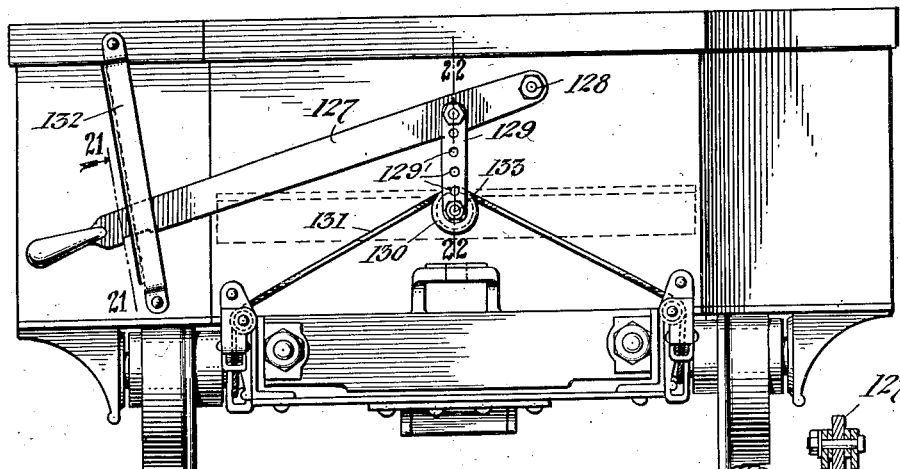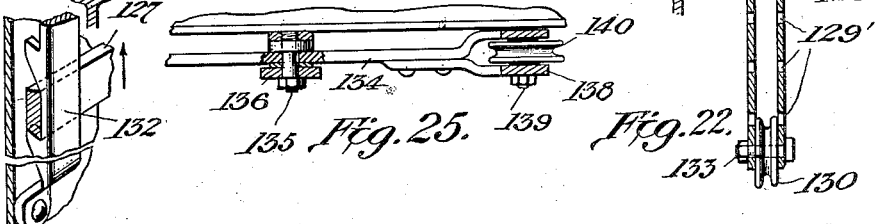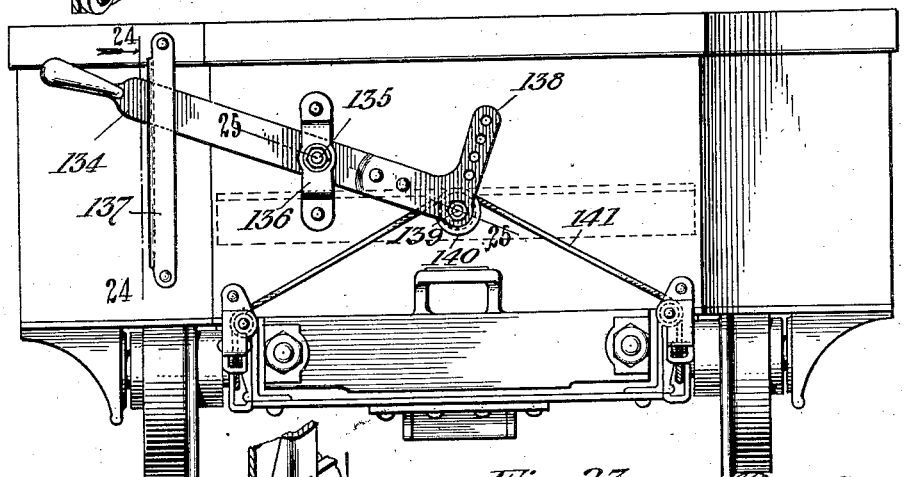

Patented July 4, 1933

1,916,785

UNITED STATES PATENT OFFICE

GLENN E. EDMUNDS, OF COLUMBUS, OHIO, ASSIGNOR TO THE BONNEY-FLOYD COMPANY, OF COLUMBUS, OHIO, A CORPORATION OF OHIO

MINE CAR BRAKE MECHANISM

Application filed June 22, 1931. Serial No. 546,107.

The present invention relates particularly to mine car brake mechanism including cable transmission means between the brakes and the operating station. As applied to a mine car, brake shoes are arranged for cooperation with the front and rear wheels at each side of the car. Cable lengths at the sides of the car extend to independent rock shafts, each of which, through a pair of cams, serves to force the associated shoes against the wheels. The cable lengths are simultaneously tensionable by means of a lever, the rock shafts being in turn self adjusting to equalize the force exerted on the associated shoes.

Various forms of connecting means between the cable lengths and lever are contemplated under the present invention. According to one form, the lever is connected to a winding drum on which the cable lengths are windable and the drum may be bodily movable, as well as rotatable, to equalize the tension on the cable lengths. In the utilization of the drum, novel means are provided for the attachment of the lever thereto so that cable slack may be readily taken up and, further, the lever may be disposed for pull-up or push-down operation at either side of the car.

According to other embodiments of the invention, the cable lengths which are in integral connection with each other, are reeved over a simple sheave carried by the operating lever, the sheaves being preferably adjustable to take up slack. Here, as contrasted to the embodiment first mentioned, tensioning of the cable lengths is effected by the bodily displacement of the rotary element or sheave. the latter rotating to permit equalization of tension.

The invention further includes certain important structural features which will be hereinafter pointed out and all of which contribute to the attainment of the general object of the invention to secure efficient braking operation with great strength of the braking apparatus and its appurtenances.

As illustrating the invention, I have shown it, in the accompanying drawings, as applied to two mine car constructions. It will be understood, however, that the invention is by no means limited in this respect. In the drawings, Figure 1 is a plan view of a mine car, with parts broken away, showing the general arrangement of the new mechanism;

Figure 2 is an end elevation of the car of Figure 1;

Figure 3 is a section on line 3—3 of Figure 1;

Figure 4 is a perspective showing the mounting and direct operating means for the brake shoes;

Figure 5 is a trans-axial section of a cable winding drum;

Figure 6 is a view in perspective of one end of a drum operating lever;

Figure 7 is an end elevation of another form of mine car with the invention applied thereto;

Figure 8 is a transverse sectional view of a portion of the car of Figure 7;

Figure 9 is an elevation of a cable guiding device, the adjacent portion of the car body being shown in section;

Figure 10 is a section on line 10—10 of Figure 7;

Figure 14 is an enlarged elevation of the drum shown in Figure 12;

Figure 15 is a section on line 15—15 of Figure 14;

Figure 16 is a section on line 16—16 of Figure 14;

Figure 17 is a plan view of the drum of Figure 14;

Figure 18 is a section on line 18—18 of Figure 14;

Figure 19 is a side elevation of the drum of Figure 14;

Figure 20 is an end elevation of a mine car showing a further modified form of brake control mechanism;

Figure 21 is a section on line 21—21 of Figure 20, in perspective;

Figure 22 is a section on line 22—22 of Figure 20;

Figure 23 is an end elevation of a mine car showing another modified form of brake control mechanism;

Figure 24 is a section on line 24—24 of Figure 23, in perspective; and

Figure 25 is a section substantially on line 25—25 of Figure 23.

Figure 11:
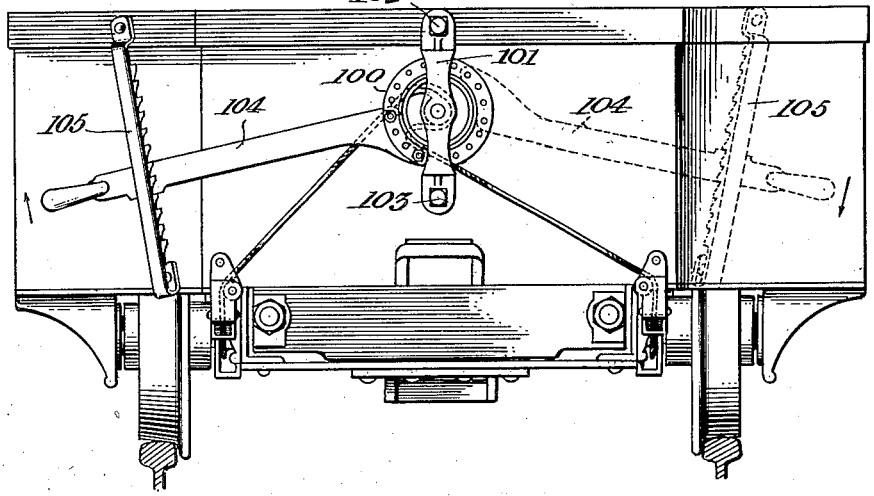
Figure 11 is an end elevation of a mine car showing a modified form of the brake control mechanism.

Referring to the drawings, and first to Figures 1 to 6, reference numeral 11 designates generally a mine car having a substantially uniplanar floor 12 interrupted by the wheel boxes 13 and 14. Each wheel box, as may be most clearly seen at the bottom of Figure 1 and right of Figure 2, is made up of inner and outer side frames 15 and 16 in which are journaled the car wheels 17 and 18, the tops of the wheels being covered by guards 19 and 20. A plate 14' forms the box top between the guards and the ends of the wheel boxes are closed by means of plates 21 and 22. The inner side frames of the wheel boxes are secured to the main sills 23 and 24 which are in the form of angle bars extending from end to end of the car body. The car body also includes end walls 25 and 26 and side walls 27 and 28. The floor and side walls are connected through angle bars 29 and 30. For the purposes of the present application, it is thought that this general description of the car will suffice, since it has been particularly described and claimed in my co-pending application, Serial No. 550,581, filed July 13, 1931.

Disposed between the wheels 17 and 18 and between the side frames 15 and 16 is a channel bar 31 supported at its ends on bars 32, which at their inner ends, as at 33, are riveted through the floor to the horizontal web of sill 24. The portions 34 of the bars are secured to the lower horizontal web of outer side frame 16, while the ends 35 of the bars are riveted to the angle strip 30.

Slidably supported in the channel of member 31 are a pair of brake shoes 36 and 37 while between the shoes is disposed a bolt 38 supported at one end in apertures in the inner side frame and main sill and at the other end in the outer side frame. A sleeve 39 has a pair of cams 40 and 41 formed integral therewith, and is rockable on bolt 38 so that the cams 40 and 41 may be caused to engage shoes 36 and 37 respectively and move them into braking engagement with the wheels. In order that the action of the cams may be equalized, one or both of the bearing apertures for bolt 38 are in the nature of horizontally elongated slots, Figure 1, so that the cams are rendered self-adjusting. Further, in order that the cams may have a large range of action, they have a considerable radial projection, and channel member 31 is provided with an aperture 31' through which the end of cam 40 may project. The aperture 31' also serves as a means of escape for matter collecting in the channel. Bars 32, being at the ends of the channel member 31, most effectively take the downward thrusts of the brake shoes. Upward thrusts are taken by the wheel hoods and cover plate 14'.

Sleeve 39 is provided at each end with clutch teeth as at 42, the cams being disposed midway between the sleeve ends. A sleeve 43 mounted on bolts 38 inwardly of the brake shoes, has clutch teeth as at 44 positively engaging the clutch teeth of sleeve 39, and has integral therewith an operating lever 45. A tubular filler piece 46 is mounted on bolt 38 immediately inside of the outer and side frame, the abutment of the two outer sleeve portions 43 and 46 with the inner and outer side frames respectively serving to properly position the cams relative to the shoes. Tension springs 47 and 48 tend to move the shoes to inoperative position.

It will be understood that the described arrangement is repeated on the other side of the car, and it will also be understood that due to the provision of the clutch teeth on each end of sleeve 39, the sleeve may be interchangeably used at both sides of the car, and the same applies, of course, to sleeves 43 and 46.

Secured to the ends of the brake operating levers 45 are cable lengths 49 and 50 which extend beneath the car floor to the sides of the bumper 51 which projects somewhat beyond end wall 25. Brackets 52 and 53 secured to the sides of the bumper support pulleys 54 and 55 about which cable lengths 49 and 50 are upwardly trained. Pivotally suspended on a bolt 56 which is passed through the upper margin of wall 25 and through a reinforcing strip 25' therefor, is a bracket 57 having arms 58 and 59 between which a drum 60 is journaled on a bolt 61. The drum 60 is provided with peripheral apertures 62 and 63 and an inner web 64 extending curvilinearly from one side of opening 62 to the hub of the drum. The cable lengths 49 and 50 are preferably portions of a single cable whose central portion is received through the apertures 62 and 63 in the manner shown in Figure 5, the cable lengths being guided from pulleys 54 and 55 by means of pulleys 65 and 66 mounted on bolts projecting from the end element or wall 25.

Drum 60 has formed integral therewith a radial flange 67 provided with a series of axially extending bores 68 angularly spaced about the drum axis. A lever 69 has an expanded end 69' to which are fixed a pair of lugs 70 and 71 adapted to engage in a pair of bores 68. A pair of apertures 72 and 73 formed in the expanded end of lever 69 are adapted to register with another pair of bores 68 and to receive screws 74 and 75 which are threaded in bores 68 to secure the lever to the drum flange.

Lever 69 at its opposite end is provided with a handle 76 and projects behind a guard 77 in cooperative relation with a toothed segment 78.

With the parts as shown in Figure 3, the brakes are released. Upon upward movement of lever 69, drum 60 is rotated in a clockwise direction, thereby tensioning cable lengths 49 and 50 and rocking the cam shafts. Since bracket 57 is freely pendulous, the drum is bodily movable about bolt 56 to equalize the tension exerted on the cable lengths. When, through the wearing down of the brake shoes, slack develops in the cable lengths, lever 69 may be removed, the drum rotated to take up the slack, and the lever again secured to the drum flange in a new angular relation thereto, the provision of a large number of bores 68 rendering exact adjustment possible.

In Figures 7 to 10, the invention is shown as applied to a mine car of a type generally similar to that shown in my U. S. Patent No. 1,678,563, dated July 24, 1928. According to this construction, the wheel supporting side frames are disposed below the outside floor portions of the car body. Due to the different spacing of the side frames, the built-up cam operating rock shafts omit the filler portions 46, as may be seen from Figure 8. The channel members 31 are supported at their ends on bars 79 whose inner ends are riveted through the floor to the horizontal web of the inner side frame 80 while the outer ends of bars 79 are supported on hangers or stirrups 81 secured to the outer side frame 82.

The cable lengths 83 and 84 are trained along the inner side frames and guided upwardly and inwardly to the drum 85 by means of guide members 86 and 87 of substantially similar construction. The guide member 87, Figure 9, comprises a bracket having vertical and horizontal arm portions 88 and 89 adapted to be secured to the end wall 90 and floor 91 respectively of the car body. Mounted in the bracket below horizontal portion 89 is a pulley 92 on an axis substantially parallel to the axes of the car wheels. Mounted in the bracket on an axis extending somewhat above the upper face of horizontal portion 89 and at right angles to the axis of pulley 92 is a pulley 93. Pulleys 92 and 93 have a common vertical tangent, the former guiding the cable length 84 upwardly and the latter guiding it upwardly and inwardly to the drum. It will be noted that pulley 93 is brought as close as possible to the end wall 90 so as to bring the cable lengths close to the end wall of the car and to accommodate this disposition, drum 85 is positioned with its attachment flange 94 to the outside, Figure 10. Lever 95 is secured to the inner face of flange 54 to bring it close to the end wall.

The vertical portion of the cable lengths in guide members 86 and 87 is protected against horizontal impacts by vertical walls as at 96, Figures 7 and 9, integral with the brackets. The inner side frames 80 have outwardly projecting axle seats as at 97 and integral reinforcing pieces 98 extending between the outer lower edges of the axle seats and the bottoms of the side frames define guide apertures 99 for the horizontal cable portions.

The operation of the arrangement shown in Figure 7 is, of course, the same as has been described with reference to Figures 1 to 6.

According to Figure 11 a drum 100, identical with drum 60, is mounted in a bracket 101 secured at its ends to the car end by means of bolts and nuts 102, 103. The drum 100 thus has a constant axis of rotation, and this arrangement is preferable under some circumstances to the pendulous drum support above described. A lever 104 is removably securable to the drum flange and cooperates with a toothed guide bar 105. The cable lengths are tightened by moving the lever 104 upwardly, the teeth of the guard being faced upwardly to hold the lever in adjusted position.

Under some circumstances it may be desirable to have a push-down operation of the lever and position the lever at the right hand side of the car. Under these circumstances, the lever is removed from the drum, that is, from the full line position of Figure 11, and reattached in the dotted line position of Figure 11. Guard 105 is also transferred to the right hand side of the car and secured with its teeth projecting downwardly.

Conditions and preferences vary greatly so that it is desirable that the drum may be rotatable by a pull-up or push-down movement at either side of the car, and for this reason I have designed the drum and lever arrangement shown in Figures 12 to 19.

Referring to Figures 14 to 19, the drum generally indicated at 106 comprises a cylindrical winding flange 107 and axially spaced radially expanded circular flanges 108 and 109, the former being provided with the axially extending apertures 108'. The drum web 110 supports a hub 111 within flange 107, and curved ribs 112 and 113 extend divergently from the hub to the inner periphery of flange 107, as most clearly shown in Figure 14. The flange 107 is provided with apertures 114 and 115 adjacent the ribs and between the latter, a wall of aperture 114 being in substantial continuation of the convexly curved surface of rib 112 and a wall of aperture 115 being in substantial continuation of the convexly curved surface of rib 113. Apertures 114 and 115 are axially offset, as is clearly shown in Figure 17, aperture 114 being adjacent radial flange 109 and aperture 115 being adjacent the perforated flange 108.

Opposite apertures 114 and 115, flange 107 is provided with a pair of apertures 116 and 117, the adjacent walls of these apertures being curved and having continuations formed by the curved ends of inwardly thickened portions 118 and 119 of the flange. Rib 112 has an aperture 120 which is in a plane with apertures 115 and 117 and rib 113 has an aperture 121 in a plane with apertures 114 and 116.

If the drum is to exert a tensioning effect upon rotation in a clockwise direction, the cable portion, as at 122, Figure 14, is reeved through apertures 114, 121 and 116. Under these conditions the lever 123, Figures 12 and 13, may be secured to the drum in the full line position of Figure 12 for pull-up actuation at the left hand side of the car or it may be secured to the drum to extend to the right hand side of the car for push-down operation, the toothed guard 124 being accordingly disposed either in the full line or the dotted line position.

Figure 12:
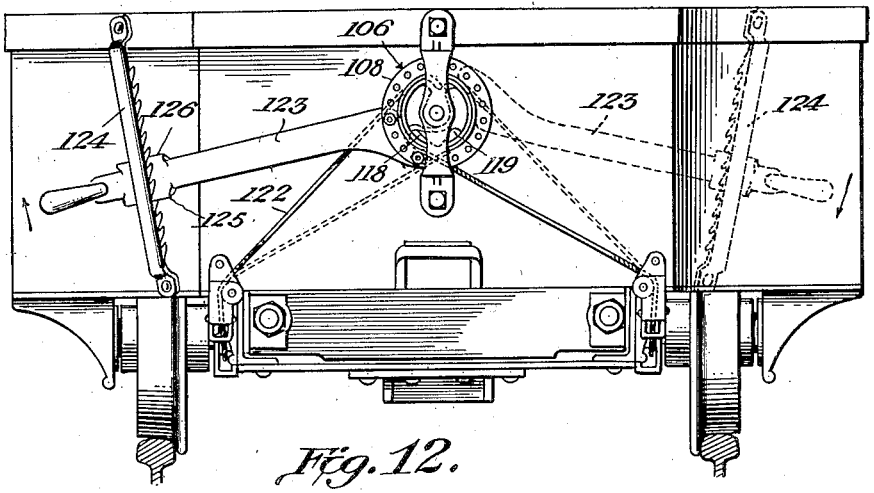
Figure 12 is an end elevation of a mine car showing a further modified form of brake control mechanism.
Figure 13:
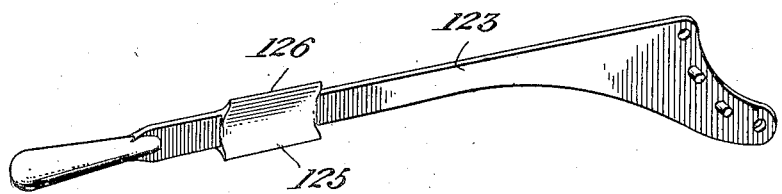
Figure 13 is a perspective of the brake lever shown in Figure 12.

If the drum is to rotate in a counter-clockwise direction for tensioning the cable, the latter is reeved through apertures 115, 120 and 117, as indicated in dotted lines in Figure 12. Under these circumstances it will be understood that with lever 123 in the full line position of Figure 12 the guard 124 must be reversed so that its teeth will be faced downwardly, while in the dotted line position it must be reversed so that the teeth are faced upwardly. The lever extends to the left for push-down operation and to the right for pull-down operation. The lever is provided with opposite edges 125 and 126 for cooperation with the toothed guard, irrespective of the direction in which the teeth of the latter are faced.

It will be noted that the double direction drum just described embodies, in duplication, the structure of the single direction drum described at the outset. In either case, it will be noted that means are provided for securely gripping the cable in its passage through the drum and that these means are so formed as not to chafe or kink the cable.

According to Figures 20, 21 and 22, a lever 127 of the first class is pivoted by means of a bolt and nut 128 to the car end and has suspended therefrom adjacent its pivot a clevis 129 which rotatably supports a sheave 130 over which is engaged the endless cable 131. A toothed guard 132 is provided for cooperation with the free end of the lever, the lever being pulled up to displace the sheave upwardly and thereby tension the cable lengths, the sheave being rotatable for the purpose of tension equalization. Sheave 130 is supported on a bolt 133 which may be moved upwardly into any of the registering apertures 129′ to take up slack in the cable. As contrasted to the arrangement shown in Figure 2, bodily movement of the rotary member 130 serves to tension the cable length while its rotary movement permits equalization.

According to Figures 23, 24 and 25, a lever 134 of the second class is provided and is pivoted on a bolt 135, and passed through a bracket 136 and the end wall of the car. A toothed guard 137 is disposed near the handle end of lever 134 for cooperation therewith, the operating direction of the lever being downward or clockwise. At its foot end the lever has an upward angular extension 138, the foot end of the lever being bifurcated and supporting on a bolt 139 a sheave 140 over which the endless cable 141 is engaged. It will be understood that the sheave is bodily displaced for tensioning the cable and rotates to permit equalization. The bolt 139 may be disposed in any of the registering apertures 141 of the foot portion of the lever for the purpose of taking up the cable slack.

It will be understood that the described structures may be considerably varied without departure from the scope of the invention and accordingly I do not limit myself except as in the following claims.

I claim:—

1. Mine car brake operating mechanism comprising a rotatable drum, cable lengths led from substantially opposite directions to said drum and simultaneously windable thereon upon rotation thereof, and means supporting said drum for bodily movement whereby to equalize the tension exerted on the cable lengths.

2. Mine car brake operating mechanism comprising a rotatable drum, cable lengths led from substantially opposite directions to said drum and simultaneously windable thereon upon rotation thereof, and a pivoted bracket pendulously supporting said drum for tension equalizing movements thereof.

3. In a mine car comprising a wheel supported body having an upright end element, brakes for the wheels at each side of the body, brake operating cable lengths guided to laterally spaced points at the upright end element, a pendulous bracket pivoted to said upright end element, a drum rotatably supported at the lower end of said bracket in normally substantially symmetrical relation to said laterally spaced points, said cable lengths being connected to said drum for tensioning thereby, and means operable to rotate the drum.

4. Structure according to claim 1 wherein the cable lengths are portions of a single cable and the drum is provided with spaced peripheral openings through which the cable is reeved.

5. Mine car brake operating mechanism comprising a rotatable drum provided with a series of bores angularly spaced about the drum axis, and a lever provided at one end with a plurality of apertures adapted to register with a selected plurality of said bores, and means disengageably engaged in the registering apertures and bores for securing the lever to the drum.

6. Mine car brake operating mechanism comprising a rotatable drum provided with a series of bores axially spaced about the drum axis, and a lever provided at one end with a plurality of lugs for engagement in a selected plurality of said bores, said lever end also having an aperture registering with another bore when the lugs are so engaged, and means disengageably engaged in the registering aperture and bore for securing the lever to the drum.

7. Mine car brake operating mechanism comprising a rotatable drum provided with a radial flange, the marginal portion of the flange being provided with a series of axially extending bores angularly spaced about the drum axis, and a lever having a laterally expanded end provided with a plurality of apertures adapted to register with a selected plurality of said bores, and means disengageably engaged in the registering apertures and bores for securing the lever to the drum.

8. Mine car brake operating mechanism comprising a rotatable drum provided with a radial flange, the marginal portion of the flange being provided with a series of axially extending bores angularly spaced about the drum axis, and a lever having a laterally expanded end provided with a plurality of lugs engageable in a selected plurality of said bores, said lever end also having an aperture registering with another bore when the lugs are so engaged, and means disengageably engaged in the registered aperture and bore for securing the lever to the drum.

9. Mine car brake mechanism comprising a pair of oppositely movable shoes in end to end relation, means for supporting said shoes for horizontal sliding movements, a shaft extending between the shoes, means providing bearing apertures for the shaft, said apertures being elongated horizontally, cams on the shaft for engagement with the respective shoes, and means operable to rock the shaft whereby the shoes are oppositely moved by the cams.

10. Mine car brake mechanism comprising a pair of oppositely movable shoes in end to end relation, a horizontal plate supporting said shoes for sliding movements, said plate having an aperture in its medial portion, a horizontal shaft extending between the shoes, upwardly and downwardly extending cams on said shaft, the downwardly extending cam projecting freely through said aperture, and means operable to rock the shaft whereby the shoes are oppositely moved by the cams.

11. In a mine car comprising a pair of side frames, a pair of wheels supported between said side frames in fore and aft relation, a channel member disposed between the side frames and extending substantially from wheel to wheel, a pair of bars secured across the side frames beneath the ends of said channel member, brake shoes supported on the channel member, and means for moving the brake shoes into engagement with the wheels.

12. In a mine car comprising a pair of side frames, a pair of wheels supported between said side frames in fore and aft relation, a channel member disposed between the side frames and extending substantially from wheel to wheel, a pair of bars secured across the side frames beneath the ends of said channel member, hangers on the outer side frame supporting the outer ends of said bars, brake shoes supported on the channel member, and means for moving the brake shoes into engagement with the wheels.

13. In a mine car comprising a wheel supported body having an upright end element, brakes for the wheels at each side of the body, brake operating cable lengths extending to laterally spaced points below the upright end element, a drum rotatably supported on said upright frame element in normally substantially symmetrical relation to said laterally spaced points, and pulleys for guiding the cable lengths upwardly and inwardly to the drum.

14. In a mine car comprising a wheel supported body having an upright end element, brakes for the wheels at each side of the body, brake operating cable lengths extending to laterally spaced points below the upright end element, a drum rotatably supported on said upright frame element in normally substantially symmetrical relation to said laterally spaced points, a pair of pulleys arranged on superposed angularly related axes for guiding each cable length upwardly and inwardly to the drum, and body-attached brackets supporting the pairs of pulleys.

15. For use in mine car brake mechanism, a hollow cam shaft having clutch teeth at each end thereof, and a brake actuating cam mounted on said shaft.

16. In a mine car, a side frame having a laterally projecting seat for the reception of a stub axle, and an integral reinforcing piece extending from the bottom of the side frame to the outer end of the seat and defining a cable guiding aperture.

17. Mine car brake operating mechanism comprising a rotary tensioning member mounted for both rotational movement about its axis and bodily movement transversely of its axis, cable lengths led from substantially opposite directions to said rotary member and engaged by the latter, and a lever in connection with said member operable to impart rotary movement to said member to tension the cable lengths.

18. Mine car brake operating mechanism comprising a rotatable drum, cable lengths led from substantially opposite directions to said drum for simultaneous tensioning thereby, a lever attached to said drum for rotatably adjusting the same, and means cooperable with the lever to hold it in adjusted position.

19. In a mine car comprising a wheel supported body having an upright end element, brakes for the wheels at each side of the body, brake operating cable lengths guided to laterally spaced points at the upright end element, a drum rotatably supported on said upright end element between and above said laterally spaced points, said cable lengths being connected to said drum for tensioning thereby, and means operable to rotate the drum.

20. A brake cable winding drum for mine cars and the like, said drum comprising a cylindrical winding flange provided with circumferentially spaced openings, and an inner hub portion adapted to engage a cable portion reeved through said openings.

21. A brake cable winding drum for mine cars and the like, said drum comprising a cylindrical winding flange provided with circumferentially spaced openings, a curved rib extending from the inner periphery of the flange at one side of one of said openings to and somewhat beyond said axis, the flange at a similar side of the other of said openings being inwardly thickened and shaped to form a curved lip at said last mentioned opening, said curved rib and lip constituting guide means for a cable portion reeved through the flange openings to extend in substantially opposite directions from the drum.

22. A brake cable winding drum for a mine car or the like, said drum comprising a cylindrical winding flange, a substantially central hub within the flange, curved ribs extending divergently from the hub to the inner flange periphery, the flange being provided with a pair of axially offset apertures adjacent the respective ribs and between the latter, each rib having an aperture adjacent the hub in a plane perpendicular to the flange axis and intersecting the flange aperture adjacent the other rib, the flange having a pair of circumferentially spaced and axially offset apertures on its side opposite the first mentioned flange apertures, whereby a cable portion may be reeved through the drum through an aperture of each of said pairs of apertures to extend in opposite directions from the drum and to be tensioned upon rotation thereof in either direction.

23. Mine car brake operating mechanism comprising a horizontally extending lever in pivotal connection with the car at one end of the latter on an axis extending longitudinally of the car, a sheave rotatably carried by said lever, a brake operating cable engaged over said sheave, and a toothed guard for cooperation with the lever.

24. Mine car brake operating mechanism comprising a horizontally extending lever in pivotal connection at one end with the car at one end of the latter on an axis extending longitudinally of the car, a clevis pendant from the lever adjacent the pivotal end of the latter, a sheave, means for supporting the sheave at vertically spaced points on the clevis, a brake operating cable engaged over said sheave, and a toothed guard for cooperation with the lever.

25. Mine car brake operating mechanism comprising a horizontally extending lever in pivotal connection adjacent one end with the car at one end of the latter on an axis extending longitudinally of the car, said lever having an angular extension at its foot end and in a vertical plane, a sheave, means for supporting the sheave at vertically spaced points on the extension, a brake operating cable engaged over said sheave, and a toothed guard for cooperation with the lever.

In testimony whereof I have hereunto set my hand.

GLENN E. EDMUNDS.